United States Patent [19]
Dollhopf

[11] Patent Number: 5,860,201
[45] Date of Patent: Jan. 19, 1999

[54] MULTIPLE WIDTH FIBER STRIP AND METHOD AND APPARATUS FOR ITS PRODUCTION

[75] Inventor: Rüdiger Dollhopf, Herbolzheim, Germany

[73] Assignee: Rhodia Acetow Aktiengesellschaft, Freiburg, Germany

[21] Appl. No.: 775,889

[22] Filed: Jan. 2, 1997

Related U.S. Application Data

[60] Division of Ser. No. 529,753, Sep. 18, 1995, which is a continuation-in-part of Ser. No. 093,091, Jul. 16, 1993, abandoned.

[30] Foreign Application Priority Data

Jun. 16, 1993 [DE] Germany .......................... 43 20 303.5

[51] Int. Cl.$^6$ ...................................................... D02G 1/12
[52] U.S. Cl. ............................................... 28/263; 28/268
[58] Field of Search ............................. 28/116, 263, 268, 28/269, 270, 262

[56] References Cited

U.S. PATENT DOCUMENTS

| | | | |
|---|---|---|---|
| 3,145,429 | 8/1964 | Resor ..................................... | 28/268 X |
| 3,429,018 | 2/1969 | Rosenstein et al. ................... | 28/268 X |
| 3,578,551 | 5/1971 | Gray et al. ............................. | 28/263 X |
| 3,763,520 | 10/1973 | Izawa et al. ........................... | 28/263 X |
| 4,301,579 | 11/1981 | Van Den Hoven ................... | 28/268 X |
| 5,282,294 | 2/1994 | Spaller, Jr. et al. ................... | 28/263 X |

FOREIGN PATENT DOCUMENTS

| | | | |
|---|---|---|---|
| 99318 | 12/1956 | Denmark ................................. | 28/268 |
| 3306867 | 8/1984 | Germany ................................. | 28/268 |
| 469112 | 4/1969 | Switzerland ............................. | 28/268 |

Primary Examiner—John J. Calvert
Attorney, Agent, or Firm—Bucknam And Archer

[57] ABSTRACT

An apparatus for the production of a multiple width fiber strip consisting of crimped interlaced filaments and having several zones extending in longitudinal direction of the fiber strip as well as at least one predetermined tear line (4) extending in longitudinal direction of the fiber strip, wherein the tear strength (daN) of the fiber strip, referred to the total denier (dtex) is at least about $1.7 \times 10^{-4}$ daN/dtex, has a pair of transport rolls (8,9) for jointly transporting the supplied bands (1,2) and a crimping chamber (10.1, 10.1, 11, 12, 13, 14) which is arranged downstream of the pair of transport rolls (8, 9).

7 Claims, 1 Drawing Sheet

MULTIPLE WIDTH FIBER STRIP AND METHOD AND APPARATUS FOR ITS PRODUCTION

This is a Divisional of application Ser. No. 08/529,753, filed Sep. 18, 1995 is a CIP of 08/093,091 filed Jul. 16, 1993 abandoned.

BACKGROUND OF THE PRIOR ART

Field of the Invention

The present invention relates to an apparatus for producing multiple width, fiber tow strips, namely in particular, multiple width filter tow strips consisting of interlaced filaments, a method for producing these fiber strips, and an apparatus for carrying out this method.

By a filter tow strip is to be understood a fiber strip which is composed of interlaced filaments or fibers. The filaments of the filter tow strip being similar to a non-woven fabric or web consist for example of cellulose acetate. The filter tow strip is crimped or curled by a so-called crimping machine or curling device (stuffer box) and is then compressed to a bale, to be ready for further processing to cigarette filters for rod-shaped smoking articles. The entire manufacture from the starting product cellulose to the filter tow strip packed in the bale is known e.g. from "Die Herstellung von Rhodia Filter Tow" Technische Information 1-01, Rhone-Poulenc Rhodia AG, Freiburg, January 1993. The known filter tow strips show uniform interlacing of the filaments over the entire width of the strip and have a substantially constant weight over their length.

The U.S. Pat. No. 3,512,230 granted to Ettore Luzzatto describes generally a method and apparatus for the production of non-woven fabrics with interlaced and crimped filaments or fibers. A plurality of filaments is produced by a conventional extruder comprising a spinneret whose nozzles are in alignment and closely spaced apart so that the filaments of this plurality are closely adjoining to one another. This close side-by-side relationship among the several filaments, which lie in a single plane, could, however, be obtained in the not immediate neighborhood of the spinneret output end but somewhat distant therefrom.

The plurality of filaments, wherein the filaments retain this condition of coplanarity, parallelism and side-by-side relationship, is sent into and through a mechanical crimping device, wherefrom the plurality emerges at a given speed and in a crimped condition. The filaments under these conditions could exhibit physically ascertainable undulations or even a mere tendency towards assuming an undulate trend. In view of the side-by-side relationship among the individual filaments, the crimping effect sets up a number of points of localized contact among adjacent filaments, even assuming that many points of contact might have possibly been given rise to upstream of the crimping device.

The formation of these points of contact or interlacing of the filaments, where the individual filaments adhere and are initially being interlocked has, obviously, a mere casual nature on a microscopical scale and is regular only from a statistical point of view. As a matter of fact in view of the regular relative arrangement of the filaments of the plurality at the input of the crimping device, and also on account of the regular way in which the conventional device mechanically acts upon filaments and yarns being fed therethrough, it has been ascertained that the points of contact are distributed, with a surprisingly advantageous statistical distribution, on the plane containing the plurality of crimped filaments. These points of contact are prevailingly formed in that the filaments which, at the output of the crimping device are undulated in planes perpendicular to the plane of the plurality, and which are parallel and susceptible of being closely approached to one another, do not stay physically in said closely approached planes and, by being displaced, they come into mutual contact.

In order that the most favourable conditions for the formation of numerous regularly distributed points of contact may be achieved, it is advantageous that the known crimping device impart to the individual filaments undulations having an amplitude which is considerably wider than the interspace between closely adjoining filaments present in the plurality of filaments at the input end of the device.

In the DE 1 435 438 filed by Eastman Kodak Company in 1963 a method for introducing a continuous strip of cellulose acetate filaments into a crimping apparatus is described, which produces a tow from which cigarette filters could be produced. The known crimping apparatus (stuffer box) comprises a pair of transport rolls for catching the strip and for squeezing the strip of filaments therebetween in order to achieve an interlaced structure of the filaments of the strip, and a crimping chamber with a clapper gate unit for crimping the strip output of the pair of transport rolls by intermittent upsetting or compressing the strip.

The patent U.S. Pat. No. 4,259,769 to Greve et al. describes a method and apparatus for banding tows of filamentary material. Greve states that the known pneumatic banding devices are incapable of reliably converting the tow into a layer of uniform thickness, width and density because the accumulations of filaments in certain strip-shaped portions of the running tow are not spread apart in the same way as the thinner strip-shaped portions of the tow. Streams of air which pass through the tow flatten and increase the width of the tow, but their equalizing or homogenizing action is far from uniform. The object in the Greve's patent is to provide a method of banding a running tow of filamentary material in such a way that the width of the banded tow is more uniform and the orientation of filaments in the banded tow is more satisfactory than in known tows.

Greve's method consists of the steps of transporting the tow lengthwise to the nip of two advancing rolls along an elongated path and in a predetermined direction, directing a plurality of discrete streams of pressurized gaseous fluid, for instance transversely against the running tow so that each stream contacts and expands laterally a discrete strip-shaped portion of the tow, monitoring the permeability of such strip-shaped portions of the running tow, and adjusting the expanding action of the respective streams when the monitored permeability, that is the density of the strip-shaped portions deviates from a predetermined optimum value. The tow which consists of filamentary filter material is transported in a lengthwise direction by means of two rollers. The filaments of the tow are normally crimped and are movable relative to each other. The width of the running tow normally varies from increment to increment or at irregular intervals. Since the number of filaments in the tow is normally constant, the thickness and density of neighbouring strip-shaped portions of the untreated tow vary from portion to portion. The strip-shaped portions extend lengthwise of the tow i.e., in substantial parallelism with the marginal portions of the tow, and each strip-shaped portion is caused to move past a discrete banding device. Greve's apparatus comprises six neighbouring banding devices which respectively comprise plenum chambers forming a tow which extends transversely of the lengthwise direction and adjacent to a selected portion of the elongated path for the tow. The upper walls of the plenum chambers are adjacent to the underside of the running tow and are respectively provided with pairs of orifices which discharge streams of air against the strip-shaped portions of the tow. The streams expand the strip-shaped portions laterally and equalize the distribution of filaments so that the tow is converted into a wide layer in which the orientation of filaments is substantially uniform and the density of each laterally expanded strip-shaped portion matches or closely approaches a predetermined optimum value. Consequently Greve describes a monowidth fiber strip, that is the known tow having only one part.

The patent document U.S. Pat. No. 4,285,650 issued to Müller et al, describes an apparatus for producing tobacco product filter rods. Müller uses a paper web which has a multiplicity of rib-like deformations, which run parallel in the longitudinal direction, in the direction of movement, and are of a denser fibre structure, and also longitudinal zones, located between the former zones, having a highly fibrillated structure and a multiplicity of unconnected longitudinal grooves. The paper web is first fed to equipment which essentially consists of two embossing rollers which are arranged with their axes parallel and with the distance between the axes being adjustable. The two rollers have projecting ribs on their surfaces respectively, these ribs extending around the entire surface of the rollers and running parallel to the axes of the rollers. The two rollers have a cross-section with projecting ribs that are absolutely identical and the rollers are driven together in such a way that they rotate at the same surface speed.

The document GB 2 265 298 A, published on Sep. 29, 1993 describes a method of and a machine for making filters for rod-shaped smokers'products. Two or more tows of fibrous filter material are simultaneously advanced along neighbouring paths through several processing units into a rod forming unit to be converted into filter rods which are ready to be subdivided into filter rod sections of unit length or multiple unit length. At least one of the processing units is designed to simultaneously treat all of the tows, and at least one of these units is designed to treat the tows independently of each other, such independent treatment renders it possible to eliminate differences between the characteristics of the ultimate products or to intentionally impart to products obtained from different rods different characteristics such as density and/or the resistance to the flow of tobacco smoke. The plural tows can be withdrawn from a single source storing a discrete bale for each tow, a common bale for several tows or a bale having an integral tow of multiple unit width which is subdivided by separating means into several narrower tows not later than at the time of entering the unit or units which are designed to individually treat each tow on its way toward the rod forming unit. The tows can be advanced side-by-side in a common plane or in several planes above each other.

When using one integral tow of multiple width the separation into several narrower tows does provide quite strong fluctuations of the denier or titer of the narrower tows. These fluctuations affecting the quality, especially the pressure drop and weight, of the produced filter rods are difficult to avoid by the known apparatus.

SUMMARY OF THE INVENTION

The object of the present invention is to provide an apparatus for the production of a fiber strip, in particular a filter tow strip, which offers productivity and quality advantages in its processing to filter skeins or rods.

This object is solved by a multiple width fiber strip, in particular multiple width filter tow strip, which consists of interlaced and crimped filaments and which has several zones extending in parallel in longitudinal direction of the fiber strip as well as at least one predetermined tear line or rated tear line providing a predetermined breaking location of the fiber strip and extending in longitudinal direction of the fiber strip between said zones, the tear strength or tensile strength (daN) of said fiber strip, referred to the total denier or total titer (dtex), being at least about $1.7 \times 10^{-4}$ daN/dtex.

According to a preferred form of the multiple width fiber strip according to the invention, said tear strength referred to the total denier is at least about $2.5 \times 10^{-4}$, in particular at least about $3.5 \times 10^{-4}$ daN/dtex. The multiple width fiber strip according to the invention must have the tear strength referred to so that it can be treated in the conventional treatment sections of a filter rod machine with a normal filament density distribution.

According to the Technical Bulletin 1-02 "Test Methods for Rhodia Filter Tow" published in February 1989 by Rhone-Poulenc Rhodia AG the tear strength (=tensile strength=breaking strength) which is the maximum tensile load applied to the tow until the breaking point is reached, is determined by means of a tensile test on a special tow stretching device at a constant elongation rate of 300 mm/min. (Mean value resulting from 10 individual test measurements). Testing takes place under standard air conditions at 20° C. and 65% relative humidity. The initial distance between the clamps is 250 mm. The clamp jaws must be shaped suitably to prevent the tow from slipping through during the tearing process. Any overlapping of the tow must be avoided between the clamps.

The filaments forming the multiple width fiber strip according to the invention are interlaced by the crimping. By "interlacing"is to be understood that for example in the filter tow strip the filaments cross as in netting, to form a cohesive filter tow strip. This net-like structure can be seen especially well when the filter tow strip is spread out. The interlacing, however, means also that the filter tow strip cannot be readily divided, as the hooking of the crosswise filaments must first be undone, which may be of importance for instance if the filter tow strip is to be subdivided for further processing. If many filaments in the fiber strip are hooked together, there is strong interlacing of the filaments. This is referred to as a high degree of interlacing. Conversely, if few filaments are hooked together, the interlacing is relatively slight. One speaks of a "low degree of interlacing." The known filter tow strips have over the entire filter tow strip an essentially constant degree of interlacing, which can be rated as normal or maximal. In contrast to the known fiber strip, the fiber strip according to the present invention can have areas whose degree of interlacing is below the normal degree of interlacing. In the context of the present invention, this area involves the "predetermined tear line". Under the action of a stretching force in longitudinal direction, the multiple width fiber strip according to the invention can, if desired, be divided into two or more parts. This stretching force must be below the tear strength of the fiber strip. In the commercial filter tow strips these maximum tear strength values, referred to the total denier lie between about $2.5 \times 10^{-4}$ and $4.5 \times 10^{-4}$ daN/dtex. This depends on the respective specification. To divide the multiple width fiber strip according to the invention into the desired parts based on the formation of the predetermined tear line, the mentioned stretching force to be applied must be lower than the tear strength of the fiber strip. This is generally achieved when the stretching force is about 10%, preferably about 25% and more particularly more than 50% lower than the tear strength.

The degree of interlacing outside the scope of the invention may tend toward 0. The degree of interlacing of the tow according to the invention, however, should be high enough so that by the stretching force (referred to the total denier) of at least $5 \times 10^{-6}$ daN/dtex, preferably at least $10 \times 10^{-6}$ daN/dtex, a complete separation of the zones of the fiber strip will not yet take place. In other words this means that the minimum degree of interlacing is fixed in the above sense by the stretching force of at least $5 \times 10^{-6}$ daN/dtex. The maximum degree of interlacing of the predetermined tear line, and hence the stretching force necessary for the separation of the zones of the fiber strip, are guided by the specification-dependent tear strength.

The filter tow strips of the invention are formed from several uncrimped bands, arranged side by side, which are subjected to a simultaneously occurring joint crimping, in which connection the process measures described below for the formation of the predetermined tear line must be observed.

The predetermined tear lines may be assigned to zones of equal width of the filter tow strip with normal degree of interlacing. This constitutes a so-called multiple width divisible filter tow strip, which in the further processing of filter rods is divided at the predetermined tear lines into single strips of equal width and equal total denier. Preferably the division is performed with a denier accuracy of ±5%, more particularly ±3%, referred to the total denier.

The filter tow strip of the invention can be packed in a bale and can then be used in the production of filter skeins for making cigarette filters and similar articles, in that the multiple width filter tow strip is supplied to a filter skein machine which divides the multiple width filter tow strip at the predetermined tear lines into individual single-width filter tow strips which are simultaneously processed in the filter skein machine to the respective number of filter skeins. Especially by using a double filter skein machine with individual processing section, an advantage is achieved. Considerable savings with regard to cost of personnel and time, in particular when changing the filter tow bales, can thereby be obtained, thus increasing the productivity. In addition, these single filter tow strips produced by division of the multiple width filter tow strip have, as has been mentioned above, essentially the same total denier and also identical crimp index, thus reducing scrap in the production of filter skeins. Such a double filter skein machine is described in the co-pending application 08/092,322 "Method and Apparatus for Producing Fiber Skeins" filed simultaneously with the present application, assigned to the same assignee as that of the present application. Reference is here expressly made to the content of that application.

In the co-pending application 08/092,322, a method for producing at least one fiber skein is described according to which at least one fiber strip is drawn off from a supply, the at least one drawn-off fiber strip is supplied to a following step of treatment in which the fiber strip is, inter alia, stretched and fluffed, the at least one treated fiber strip is then collected in a formatting unit to a fiber skein or filter skeins, which lastly are provided with a wrapping material, to form one or more continuous, wrapped fiber skeins, in particular filter skeins, the fiber strip or strips being subjected at the beginning of the treatment to a brake force to adjust the quantity to be processed and/or other properties of the fiber strip or strips, the brake force being set automatically.

To permit automatic control of the brake force on the fiber strips, there is picked up and measured e.g. a characteristic value of the produced filter skeins. The quantity to be processed of the supplied fiber strip is then set as a function of the measured instantaneous value or actual value and of predetermined values, e.g. a desired value for the respective measured characteristic value, by regulating the brake force on the fiber strip or strips.

As starting material of multi-skein production e.g. two fiber strips running side by side can be supplied simultaneously to a double skein machine or double skein filter rod machine. In this case the treatment unit sees to it that the feed quantity is controllable singly for each of the two fiber skeins. Preferably there may be used to this end individually controllable pairs of brake rolls, through which runs in each instance one of the fiber strips in the treatment unit to set the feed quantity for the further treatment automatically. By the brake force exerted by a pair of rolls on the fiber strip the feed quantity can be varied within certain limits, to be able to stay within the filter tolerances to be achieved. If, however, the two separately drawn-off fiber strips have individually greatly different properties, as e.g. a greatly different total denier or crimp index, it may become difficult to compensate the differences between the fiber strips with the individually controllable pair of brake rolls. The result would be that the simultaneously produced fiber skeins differ in their properties and at worst the desired tolerances would be exceeded. For this reason, in filter rod production, preferably a multiple-width filter tow strip is used which has a predetermined or rated tear line to make it divisible.

Preferably a double-width fiber strip or twin-tow is used which is parted at its central predetermined tear line into two single-width fiber strips in the treatment unit. The separated single-width fiber strips or respectively the two strip halves of the wide fiber strip drawn off a bale, advantageously have essentially the same material properties, in particular the same quantity or mass per length, so that overly great differences in the important material properties are reliably avoided and thus the tolerances of the fiber skeins in double fiber skein production can be met reliably.

The preferred double-width divisible fiber strip (twin-tow) according to the present invention is therefore characterized by the fact that all quality-relevant parameters for the fiber skein production can, by reason of its production, differ only insignificantly in the two fiber strip halves, as both halves of the double-width fiber strip are produced in the same operation.

The use of a double-width fiber strip according to the present invention which is drawn from a single bale has advantages in particular when the double-width fiber strip has been completely drawn off, i.e. the bale must be changed. With the double-width fiber strip of the present invention then only one bale need to be replaced and threaded into the double-skein machine to be able to continue the operation. This also constitutes an improvement over the alternative embodiment where two separate fiber strips are drawn off from a bale for each. In that case the bales basically do not expire simultaneously, so that in principle two machine stops are necessary, resulting in greater cost of personnel and more scrap. This is avoided when using the double-width fiber strip of the present invention with one bale.

The new method for the production of the multiple width filter strip according to the present invention is characterized in that several separate bands of filaments essentially extending parallel to each other are formed and the resulting bands are lastly crimped jointly, to produce one or more crimped fiber strips, in particular a filter tow strip.

Preferably, in carrying out the method according to the invention, the uncurled or uncrimped bands are—shortly before being crimped jointly—no longer guided separately. This means, in other words, that the adjacent uncrimped bands finally touch, whereupon, after crimping, a predetermined tear line with the desired degree of interlacing is produced. In specific cases it may be of advantage that uncrimped bands of different width are formed, which are crimped jointly. It may also be advantageous that several, specifically two, uncrimped bands of equal width are formed, which are crimped jointly. It is preferred in this connection that the two uncrimped bands are guided separately to just before the joint crimping, whereby there results after the crimping of the two bands a crimped fiber strip which has a predetermined tear line extending centrally.

A further development of the method according to the invention resides in that subsequently appropriate packing measures are taken. In this connection it is preferred that the predetermined tear line(s) has/have so low a degree of interlacing that, after leaving the crimping machine, several individual fiber strips are formed, in the distance of the separating wall to the nip region between the transport rolls is reduced and/or the thickness of the separating wall is increased, the produced fiber strip(s) are deposited, pressed, and packed to a bale, that the at least two individual fiber strips are deposited in a common receptacle compartmented by the separating wall, and after removal of the separating wall are jointly pressed and packed to form a uniform bale, and the individual fiber strips are deposited in two separate receptacles, are pressed separately and packed to form two individual bales. The above apparatus parts will be explained below.

The new apparatus for carrying out the method according to the invention is characterized by the following features: A pair of transport rolls for joint conveyance of the supplied bands and a crimping chamber disposed downstream of the pair of transport rolls, for crimping the bands leaving the pair of transport rolls.

Preferably the apparatus according to the invention has a separating device, in particular a separating wall, in upstream of the pair of transport rolls. By means of this separating device, the areas of low degree of interlacing, i.e. the predetermined tear line(s) can be produced in the formed fiber strip. Preferably the separating wall is variable as to its distance to the nip zone of the pair of transport rolls and as to its thickness. With decreasing distance of the separating wall from the nip zone of the pair of transport rolls, the degree of interlacing within the predetermined tear line decreases. The same is true for an increase in thickness of the separating wall. When the separating wall extends almost up to the nip zone, the bands can no longer touch from the nip zone on, and due to this fact fiber strips separated from each other are produced after the crimping. In other words, the degree of interlacing is zero in this case.

If the distance of the separating wall from the nip zone of the pair of transport rolls is relatively short, there results that the predetermined tear line of the produced fiber strip (filter tow strip) has a relatively low degree of interlacing, so that it is relatively easy to divide the multiple width fiber strip into e.g. single-width fiber strips by the separating device, yet sufficient cohesion exists. This cohesion is necessary until the fiber strip enters for instance the double filter skein machine. Via the mentioned distance of the variable separating wall to the nip zone of the pair of transport rolls, therefore, different fiber strips with different properties can be produced, i.e. with more or less pronounced predetermined tear lines. A similar control is possible also, as has been mentioned, by varying the thickness of the separating wall.

Alternatively, more than one separating wall may be provided in the apparatus according to the invention, the number of separating walls determining the number of fiber strip zones that can be separated from one another at the predetermined tear lines.

The present invention is not limited to a certain material of the fiber strips. In its practical realization it has been found that the filaments consist preferably of cellulose acetate, polyethylene terephthalate, polyolefins, such as polypropylene, or also polyhydroxybutyric acid esters, polyamides (e.g. nylon) and viscose.

BRIEF DESCRIPTION OF THE DRAWINGS

Further advantages and possibilities of use of the present invention will be evident from the following description of an embodiment of the invention in conjunction with FIG. 1.

Figure 1:
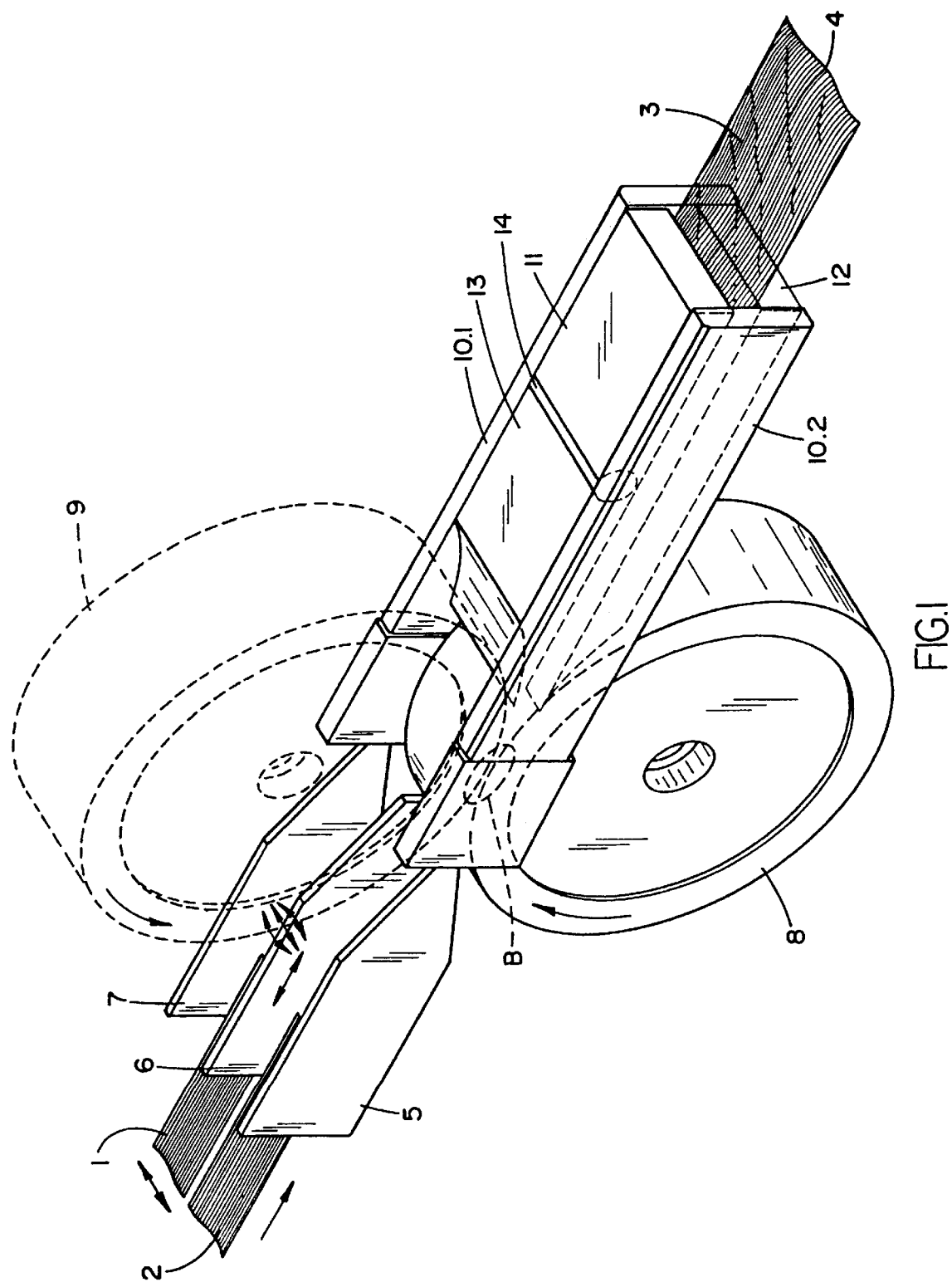
FIG. 1 shows an apparatus for producing a double-width divisible fiber strip 3 (twin-tow) from two separate bands 1 and 2 of equal hereinbelow width in which filaments of cellulose acetate are arranged substantially side by side, these bands being designated as uncrimped bands 1 and 2. The apparatus according to FIG. 1 is also referred to as a crimping machine.

The crimping machine has a pair of transport rolls 8 and 9 arranged and mounted one above the other, rotating toward each other about their roll axes in the direction of the indicated arrows. In front of the pair of driven transport rolls 8 and 9, two parallel guide plates 5 and 7 are arranged, which laterally guide the uncrimped bands 1 and 2. Between the uncrimped bands 1 and 2, in a region upstream of the pair of transport rolls 8 and 9, there is provided a wall-type separating sheetmetal plate 6 as separating device or divider. The guide plates 5 and 7 and also the separating plate 6 taper in wedge form in the direction towards the rolls, i.e. in the running direction of the two uncrimped bands 2 and 1, so that they can be guided to close to a nip zone or squeezing zone B.

In the introducing area of the pair of transport rolls the guide plates 5 and 7 ensure guiding of both uncrimped bands 1 and 2 into the pull-in zone or nip zone B of the pair of transport rolls 8 and 9. The bands 1 and 2 are separated reliably by the separating plate 6 within the introducing area of the pair of transport rolls 8 and 9. The separating plate 6 is arranged such that only a relatively small distance between the front end of the separating plate 6, seen towards the nip zone B of the pair of transport rolls, and the nip zone B of the pair of transport rolls is provided within this distance in the introducing area upstream of the nip zone B of the pair of transport rolls 8 and 9 the two uncrimped bands 1 and 2 are able to touch one another thereby providing a region of reduced degree of netting or interlacing after passing the pair of transport rolls 8 and 9. The region of reduced degree of interlacing corresponds to the predetermined tear line 4 which extends continuously in the middle between the two bands 1 and 2 in longitudinal direction or running direction of the bands 1 and 2.

By squeezing the bands 1 and 2 within the region of the nip zone B and crimping these bands in the crimping chamber interlacing of the filaments of the bands 1 and 2 is provided.

The crimping machine further has two vertical chamber walls 10.1 and 10.2 of a crimping chamber, disposed parallel to each other, to guide between them the bands 1 and 2 or the crimped and produced fiber or filter tow strip 3 with predetermined tear line 4 in running direction. The two chamber walls 10.1 and 10.2 also receive a relatively elongated delivery part 12 of the crimping chamber, on which rests the fiber strip 3. Above the fiber strip 3, between the chamber walls 10.1 and 10.2 and under an angle of 90° C. to them a movable flap 11 is provided. The flap 11 is connected to a fixed part 13 by a hinge 14 and is movable up and down in the area between the vertical chamber walls 10.1 and 10.2 for upsetting intermittently the interlaced bands 1 and 2 output from the pair of transport rolls 8 and 9, i.e. said parts 10.1, 10.2, 11, 12, 13 and 14 bring about the crimping of the bands 1 and 2 in the usual manner on the principle of an upsetting (shutter box). By the pair of transport rolls 8 and 9 the two uncrimped bands 1 and 2 are transported into the (crimping chamber).

By duplication of the separating plate 6 and scaled adaptation of the pair of transport rolls 8 and 9 and of the other parts of the crimping machine, it is easy to modify the crimping machine used according to the invention to produce e.g. triple-width, quadruple-width or quintuple-width filter two strips with the corresponding number of predetermined tear lines.

According to another modification of the embodiment according to FIG. 1, e.g. the distance of the separating plate 6 from the guide plate 7 and guide plate 5 may be different, whereby uncrimped bands of different width and dissimilar with respect to their total denier are supplied to the crimping station, to produce a filter tow strip with tow parts of different width.

The uncrimped bands 1 and 2 may comprise an identical or different filament denier to produce a filter tow strip with tow parts of identical or different filament denier.

According to another modification, the separating plate 6 may be adapted to be adjustable, so that the distance between the end of the separating plate 6 and the nip zone B of the pair of transport rolls 8 and 9, seen in the direction of the rolls 9 and 8, can be set or varied. The separating plate 6 may also be pivotable.

I claim:

1. An apparatus for producing a multiple width filter tow strip (3) consisting of crimped, interlaced filaments and having at least two zones extending in longitudinal direction of the fiber strip as well as at least one predetermined tear line (4) extending continuously in the longitudinal direction of the fiber strip, said at least one predetermined tear line having a reduced degree of interlacing in comparison with said zones adjoining said at least one predetermined tear line, the ratio of the tear strength (daN) of the fiber strip to the total denier (dtex), being at least $1.7 \times 10^{-4}$ daN/dtex., which apparatus comprises means for introducing two uncrimped bands (1), and (2) of filaments or fibers into said apparatus, a pair of transport rolls (8, 9) for transporting said bands (1), (2), a crimping chamber (10.1) (10.1) (11) (12) located downstream of said pair of transport rolls (8, 9), for crimping said bands (1,2) leaving the pair of transport rolls and at least one separating wall (6), said separating wall being multiply adjustable with respect to a distance to a nip zone (B), said nip zone (B) being formed between said transport rollers (8) and (9), said separating wall being located upstream of said transport rolls (8, 9) for separately guiding said uncrimped bands (1, 2).

2. The apparatus according to claim 1 which comprises means for allowing said bands to touch each other in the area of said transport rolls upstream of said crimping chamber whereby squeezing occurs in said nip zone (B) and a region of reduced interlacing is achieved downstream of said nip zone (B).

3. The apparatus according to claim 2 which comprises two guide plates (5, 7), each plate being located on one side of said separating wall.

4. The apparatus according to claim 1 wherein the crimping chamber has chamber walls and a movable flap (11) is located between said chamber walls, said flap moving upwardly and downwardly for intermittently upsetting said bands after they have been crimped.

5. The apparatus according to claim 1 wherein said transport rolls (8,9) are mounted one above the other and rotate towards each other.

6. The apparatus according to claim 3 wherein said means consist of said guide plates (5,7) and said separating wall (6) tapering in wedge form in the direction towards said rolls.

7. The apparatus according to claim 4 wherein said crimping chamber has a delivery part (12).

* * * * *